United States Patent
Waterson et al.

(10) Patent No.: US 10,444,730 B2
(45) Date of Patent: Oct. 15, 2019

(54) REAL-TIME COMPLIANCE STATUS FOR EQUIPMENT

(71) Applicant: Eurotherm Limited, Shropshire (GB)

(72) Inventors: Andrew Waterson, Brighton (GB); Jurgita Valmante, Worthing (GB); Kevin Robinson, Upper Basildon (GB)

(73) Assignee: Eurotherm Limited, Shropshire (GB)

( * ) Notice: Subject to any disclaimer, the term of this patent is extended or adjusted under 35 U.S.C. 154(b) by 304 days.

(21) Appl. No.: 15/365,270

(22) Filed: Nov. 30, 2016

(65) Prior Publication Data

US 2018/0150054 A1     May 31, 2018

(51) Int. Cl.
*G06F 19/00* (2018.01)
*G05B 19/4063* (2006.01)
*G06Q 10/06* (2012.01)

(52) U.S. Cl.
CPC ..... *G05B 19/4063* (2013.01); *G06Q 10/0639* (2013.01); *G05B 2219/40357* (2013.01)

(58) Field of Classification Search
CPC .. G05B 19/4063; G05B 23/00; G05B 19/418; G05B 2219/40357; G06Q 10/0639
USPC ........................................................ 700/108
See application file for complete search history.

(56) References Cited

U.S. PATENT DOCUMENTS

| | | | | |
|---|---|---|---|---|
| 6,246,325 B1* | 6/2001 | Chittipeddi | ........... | G06F 11/006 340/3.43 |
| 7,461,008 B2* | 12/2008 | Garrow | ................ | G06Q 10/06 705/7.22 |
| 8,055,370 B1* | 11/2011 | Achtnig | ........... | G05B 19/41875 340/3.1 |
| 8,711,161 B1* | 4/2014 | Scotzniovsky | .. | G01R 31/31854 345/531 |
| 2002/0143564 A1* | 10/2002 | Webb | ................... | G06Q 10/087 705/305 |
| 2007/0033129 A1* | 2/2007 | Coates | ................... | G06Q 40/06 705/36 R |
| 2013/0127958 A1 | 5/2013 | Plummer | | |
| 2013/0332376 A1* | 12/2013 | Pilon | ..................... | G06Q 10/00 705/317 |

FOREIGN PATENT DOCUMENTS

| | | |
|---|---|---|
| EP | 2530548 A2 | 12/2012 |
| EP | 2846208 A2 | 3/2015 |

OTHER PUBLICATIONS

Extended European Search Report for 17204007.3, dated Feb. 8, 2018 (12 pages).

* cited by examiner

*Primary Examiner* — Vu A Vu
(74) *Attorney, Agent, or Firm* — Stinson LLP

(57) ABSTRACT

Providing real-time compliance status for industrial process equipment. Aspects of the disclosure provide a common platform to receive data indicative of services performed on industrial process equipment via a plurality of formats and to provide the data representing the real-time compliance status via a unified format on, for example, a graphical user interface of a computing device.

13 Claims, 5 Drawing Sheets

REAL-TIME COMPLIANCE STATUS FOR EQUIPMENT

TECHNICAL FIELD

Aspects of the present disclosure generally relate to the fields of networked computerized industrial control, automation systems and networked computerized systems utilized to monitor, log, and display relevant manufacturing/production events and associated data, and supervisory level control and manufacturing information systems. More particularly, aspects of the present disclosure relate to systems and methods for managing and providing compliance data for industrial process equipment.

BACKGROUND

Service providers perform services, such as calibration, on industrial process equipment. These service providers may be external third-party providers or in-house service providers, such as a maintenance department. The industrial process operator manually receives and stores records of documented evidence of service performance and results for compliance with standards and regulations. But the various service providers each deliver documented evidence of service performance in their own format that conforms to the service provider's record keeping requirements. The industrial process operator is left to manually process and adapt the various incompatible formats into a format that conforms to the industrial process operator's record keeping requirements. Moreover, each piece of documented evidence received from service providers only provides information about the particular instrument upon which the service was performed. To determine an overall status of the equipment to which the instruments are connected, the industrial process operator must individually review instrument compliance information.

SUMMARY

Aspects of the disclosure provide a common platform, such as a data storage repository, to receive data indicative of services performed on industrial process equipment via a plurality of formats and to provide the data via a unified format. Moreover, aspects of the disclosure provide a real-time compliance status for industrial process equipment via a graphical user interface of a computing device.

In an aspect, a system includes at least one service provider computing device, a management system computing device, and a user computing device. The service provider computing device is configured to transmit data indicative of services performed on an instrument that comprises a device of an industrial process. The service provider computing device is configured to transmit the data via a communications network. The management system computing device is communicatively coupled to the service provider computing device via the communications network. The management system computing device is configured to generate a real-time compliance status for the device based on the data transmitted by the service provider indicative of the services performed on the instrument. The user computing device is communicatively coupled to the management system computing device via the communications network. The management system computing device is configured to provide the real-time compliance status of the device to the user computing device via the communications network in response to receiving a request for the real-time compliance status.

In another aspect, a method includes a management system computing device receiving data indicative of services performed on a first instrument. The management system computing device also receives data indicative of services performed on a second instrument. The first and second instruments comprise a device of an industrial process. The management system computing device receives the data via a communications network. A real-time compliance status is generated for the industrial process device by combining the received data with data indicative of services performed on the second instrument. The real-time compliance status of the industrial process device is provided to a user computing device via the communications network in response to a request for it from the user computing device.

In yet another aspect, a computer-readable medium stores instructions that, when executed by a processor, perform a process of providing a real-time compliance status of devices of an industrial process. The method includes receiving data, via a communications network, indicative of services performed on an instrument. The instrument comprises a device of the industrial process. A real-time compliance status is generated for the instrument based on the data indicative of the services performed on the instrument. A graphical user interface is generated for display on a user computing device. The user interface includes a graphical object for each of a plurality of tiers of devices of the industrial process. A graphical compliance status indicator is associated with each of the graphical objects to provide a real-time compliance status of the plurality of tiers of devices of the industrial process.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
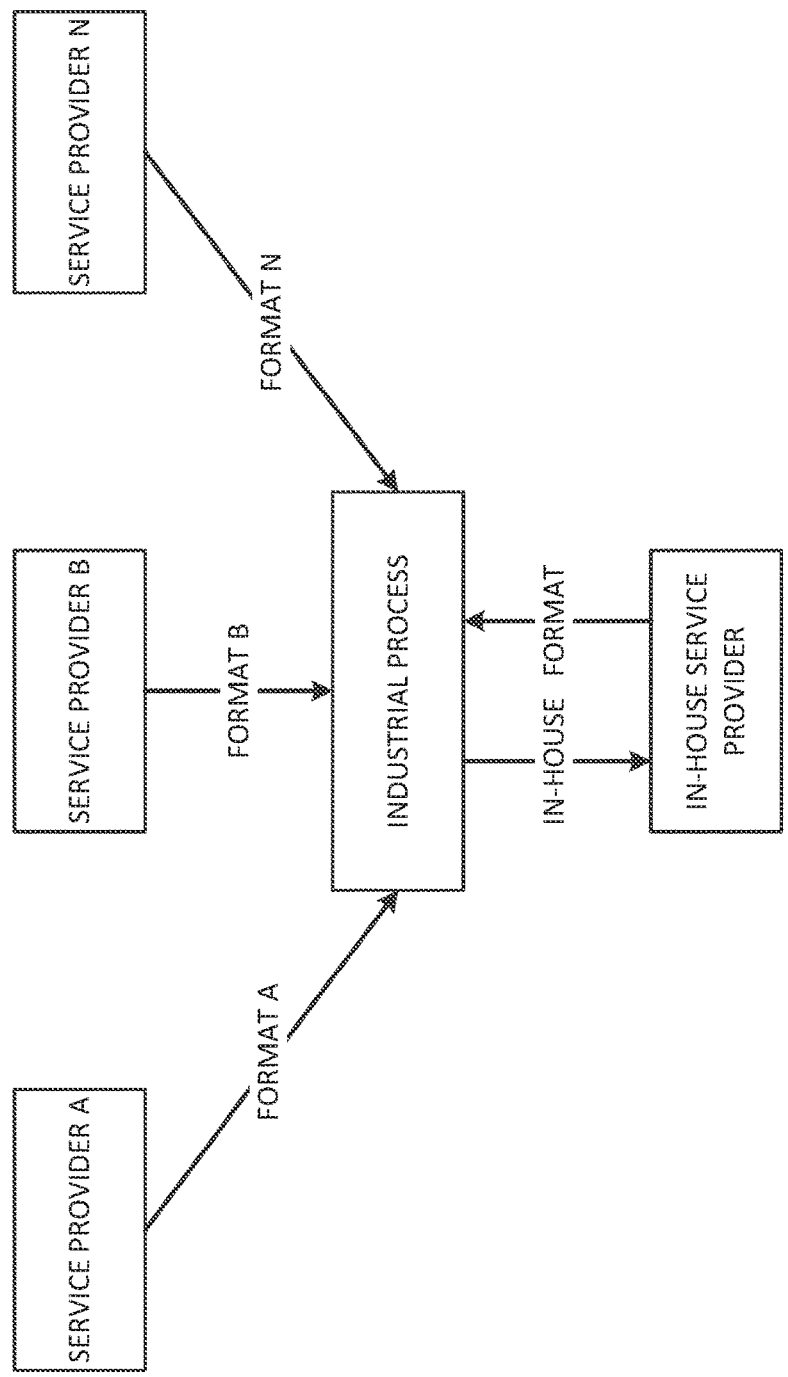
FIG. 1 illustrates an exemplary conventional arrangement of service providers providing documented evidence via a plurality of formats.

FIG. 1 illustrates a conventional arrangement of service providers providing documented evidence of service performance to an industrial process status system via a plurality of formats. In this conventional arrangement, service providers provide documented evidence of performed services in a manner (e.g., email, paper report, hand written note at time of service performance, verbal, etc.) that is most convenient to the particular service provider and/or conforms to the particular service provider's record keeping standards. Industrial process personnel are then tasked with accepting the various different and incompatible document formats for storage and for providing compliance status information based on the individual reports.

Figure 2:
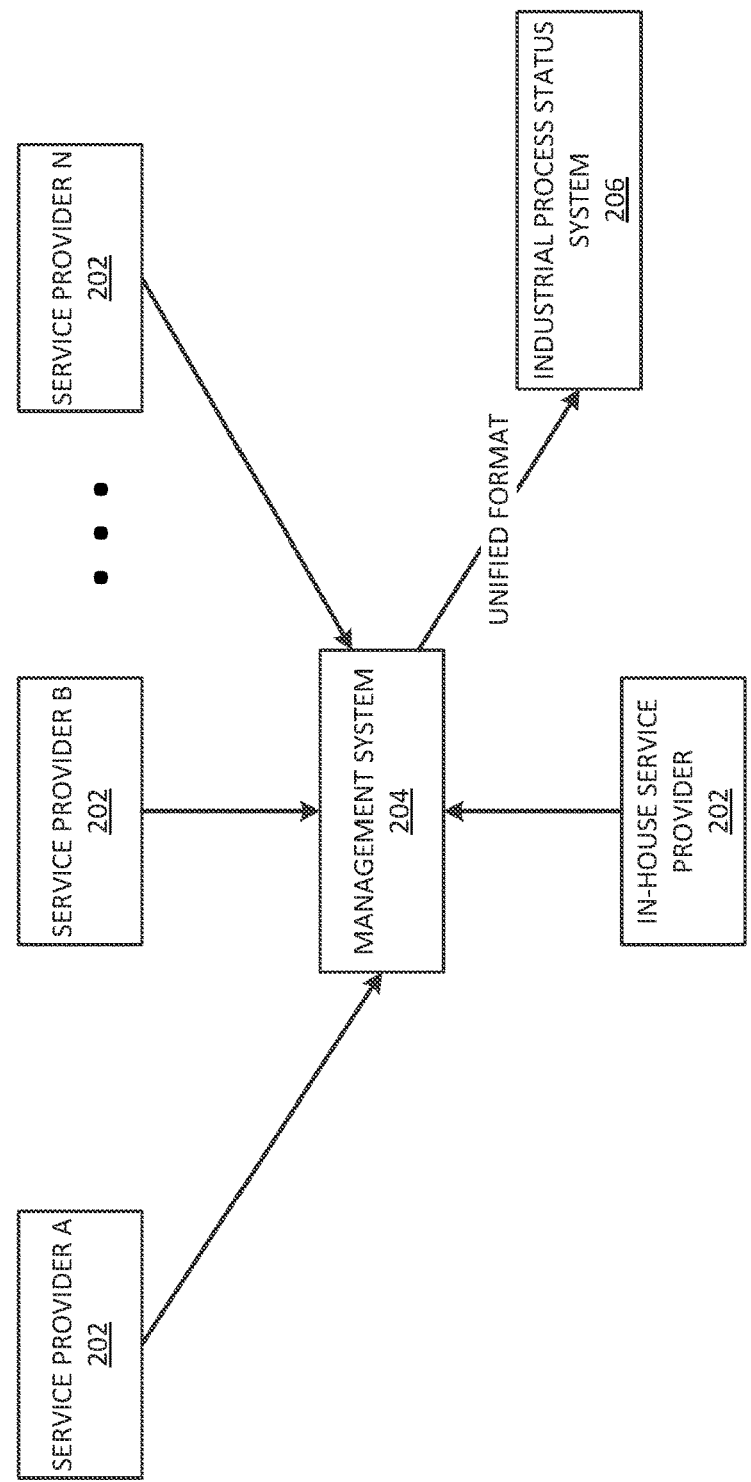
FIG. 2 illustrates an exemplary unified format management system according to an embodiment.

FIG. 2 illustrates a high-level exemplary arrangement of service providers providing documented evidence of service performance to an industrial process status system via a unified format management system in accordance with an embodiment of the disclosure. In the exemplary arrangement, service providers 202 utilize a management system 204 to record documented evidence of service performance. The service providers may be third-party service providers and/or in-house service providers, such as a maintenance department. The management system 204 is configured to provide compliance status data, including the documented evidence of service performance (e.g., certificate), to an industrial process status system 206 in a unified format. In this manner, management system 204 provides a common platform for recording documented evidence of service performance and for providing equipment compliance status information.

Figure 3:
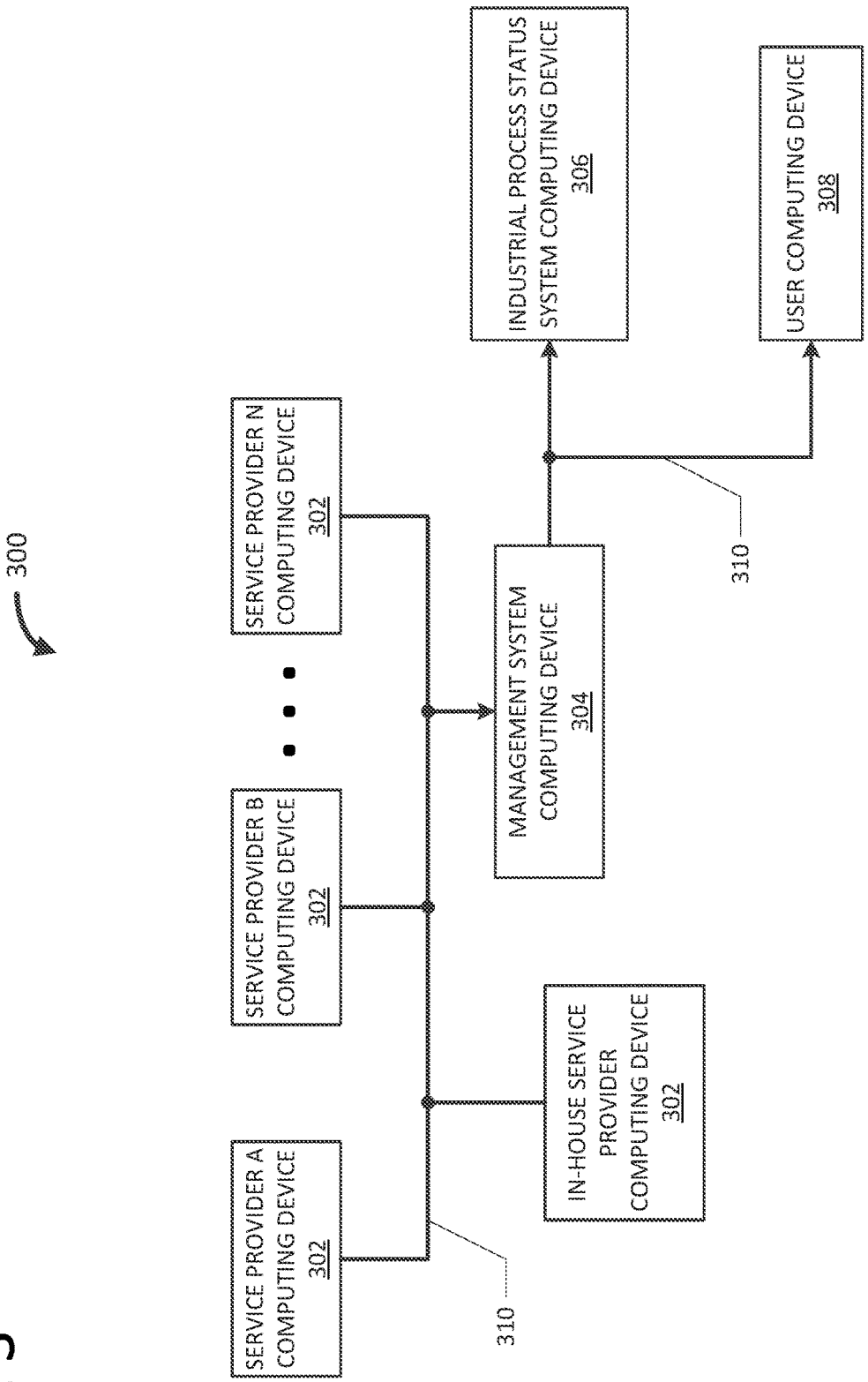
FIG. 3 illustrates an exemplary computerized unified format management system according to an embodiment.

FIG. 3 illustrates an exemplary embodiment of a computerized management system, generally indicated at 300, within which an embodiment of the disclosure may be incorporated. The system 300 includes service provider computing devices 302, a management system computing device 304, an industrial process status system computing device 306, and a user computing device 308. The service provider computing devices 302 are communicatively coupled to the management system computing device 304 via a communications network 310. The management system computing device 304 is also communicatively coupled to the industrial process status system computing device 306 and the user computing device 308 via the communications network 310.

The service provider computing devices 302 are adapted to transmit data indicative of documented evidence of service performance to management system computing device 304 via communications network 310. The industrial process status system computing device and user computing device 308 are each configured to access data stored in management system computing device 308 indicative of compliance status of equipment devices of the industrial process. Exemplary computing devices include, but are not limited to, workstation computers, mobile phones, smartphones, tablet computing devices, and the like. In an embodiment, industrial process status system computing device 306 comprises at least in part a SCADA system.

In an embodiment, the results of compliance tests are captured via an audit application (e.g., Eurotherm eCAT) and/or webpage executing on a service provider computing device 302 and assigned to an equipment device and/or sub-assembly within management system 204 executing on management system computing device 304. As further described herein, management system 204 enables equipment devices to be placed in a hierarchy of plant areas and/or manufacturer sites. The management system 204 executing on management system computing device 304 then provides a graphical compliance status indicator for display by industrial process status system computing device 306 and/or user computing device 308 via communications network 310. The graphical compliance status indicator is provided at each level of the hierarchy, with the level being dependent on tests further down the hierarchy, as further described herein. In an embodiment, the compliance status is updated dynamically in real-time as test results expire and/or new test results are uploaded to management system 204 from service provider computing devices 302.

The management system computing device 304 is adapted to provide a common platform for service provider computing devices 302 to deliver documented evidence of service performance and industrial process status system computing device 306 and/or user computing device 308 to access compliance status data based on the documented evidence. In an embodiment, computer-executable instructions are executed by a processor of management system computing device 304 (e.g., one or more server computing devices) to provide management system 204 via a cloud-based software environment. For example, management system 204 executing on computing device 304 may provide a single platform for industrial process status system computing device 306 to access documented evidence of service performance through a single account, login credentials, and workflows. Rather than reviewing documented evidence in a variety of formats to determine compliance, management system 204 executing on management system computing device 304 provides a real-time compliance status of industrial process devices in a unified, or integrated, format. In an embodiment, management system computing device 304 defines a validity period and/or an occurrence for each service type.

The communications network 310 is capable of facilitating the exchange of data among various components of system 300. The communications infrastructure may include a local area network (LAN) that is connectable to other telecommunications networks, including other LANs or portions of the Internet or an intranet. The communications infrastructure may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications infrastructure is any medium that allows data to be physically transferred through serial or parallel communication channels (e.g., copper wire, optical fiber, computer bus, wireless communication channel, etc.). In an embodiment, the communications infrastructure comprises at least in part a process control network. In another embodiment, the communications infrastructure comprises at least in part a SCADA system.

Figure 4:
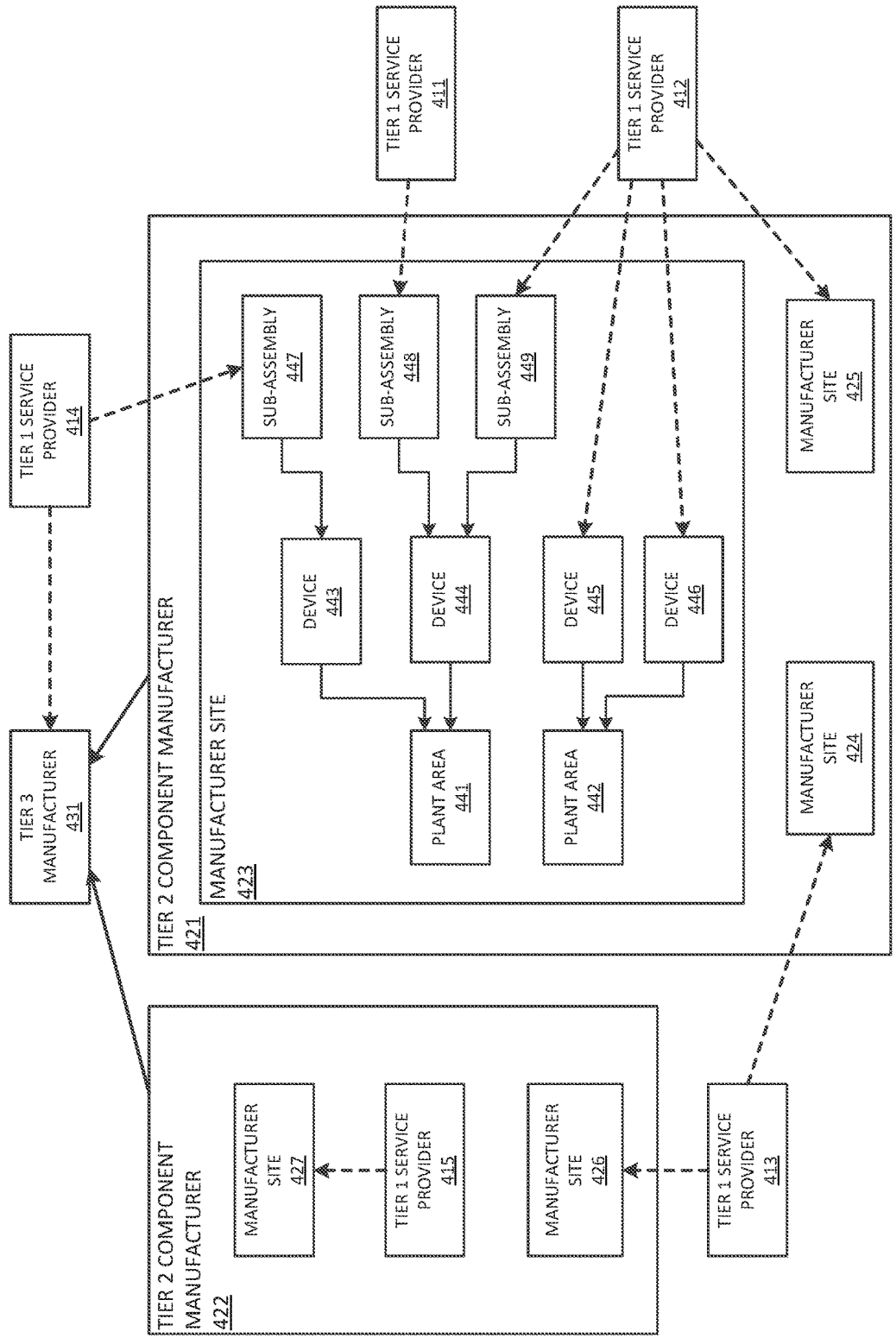
FIG. 4 illustrates an exemplary relationship among tiers of entities utilizing the unified format management system according to an embodiment.

FIG. 4 illustrates a block diagram depiction of an exemplary relationship among tiers of entities utilizing management system 204 within an aspect of the disclosure. As illustrated, the entities belong to one of at least three tiers and include Tier 1 service providers 411-415, Tier 2 component manufacturers 421 and 422, and a Tier 3 end-product manufacturer 431. The Tier 2 component manufacturer 421 includes at least three manufacturer sites 423, 424, and 425 and Tier 2 component manufacturer 422 includes at least two manufacturer sites 426 and 427. The manufacturer site 423 includes plant areas 441 and 442. The plant area 441 includes equipment devices 443 and 444 and the plant area 442 includes equipment devices 445 and 446. The equipment device 443 includes a sub-assembly 447 and the equipment device 444 includes sub-assemblies 448 and 449.

In an exemplary embodiment, Tier 1 service providers 411-415 each provide compliance-type services (e.g., equipment calibration) to equipment devices of the industrial process. Exemplary services include, but are not limited to, equipment calibration, thermal uniformity surveys (TUS), SAT system accuracy tests, visual inspections, gauge calibration, arc flash studies, contamination inspections, hardness tests, maintenance conformance reviews, vibration tests, and the like.

As illustrated by dashed lines in FIG. 4, service provider 411 performs compliance services on sub-assembly 448 and service provider 412 performs compliance services on sub-assembly 449, device 445, device 446, and devices comprising manufacturer site 425. Moreover, service provider 413 performs compliance services on devices comprising manufacturer site 424 of component manufacturer 421 and devices comprising manufacturer site 426 of component manufacturer 422. Tier 1 service provider 414 performs compliance services on sub-assembly 447 and devices comprising Tier 3 manufacturer 431. The tier 1 service provider 415 performs compliance services on devices comprising manufacturer site 427 of component manufacturer 422. In an embodiment, service providers 411-414 are third-party service providers and service provider 415 is an in-house service provider (e.g., a maintenance department).

In an embodiment, Tier 2 component manufacturers 421 and 422 manufacture component parts for assembly and integration into end-products manufacture by Tier 3 manufacturer 431. In accordance with an aspect of the disclosure, Tier 2 component manufacturers 421, 422 and/or Tier 3 manufacturer 431 utilize management system 204 to seek the compliance services of Tier 1 service providers 411-415. Because documented evidence of service performance is delivered through management system 204, service performance can be transferred from one Tier 1 service provider to another without changing the format through which Tier 2 component manufacturers 421, 422 and/or Tier 3 manufacturer receive the documented evidence.

In accordance with an embodiment of the disclosure, management system 204 provides an aggregated compliance status at the device level, plant area level, site level, and/or manufacturer level regardless of the type of compliance service performed and the Tier 1 service provider that performed it. For example, when a compliance test performed by service provider 414 on sub-assembly 447 fails (i.e., the sub-assembly is no longer compliant), the compliance status of device 443, plant area 441, manufacturer site 423, and component manufacturer 421 indicates this failure, even if compliance tests performed on other sub-assemblies (e.g., sub-assembly 448) pass. Additional details regarding the compliance status are described herein.

Figure 5:
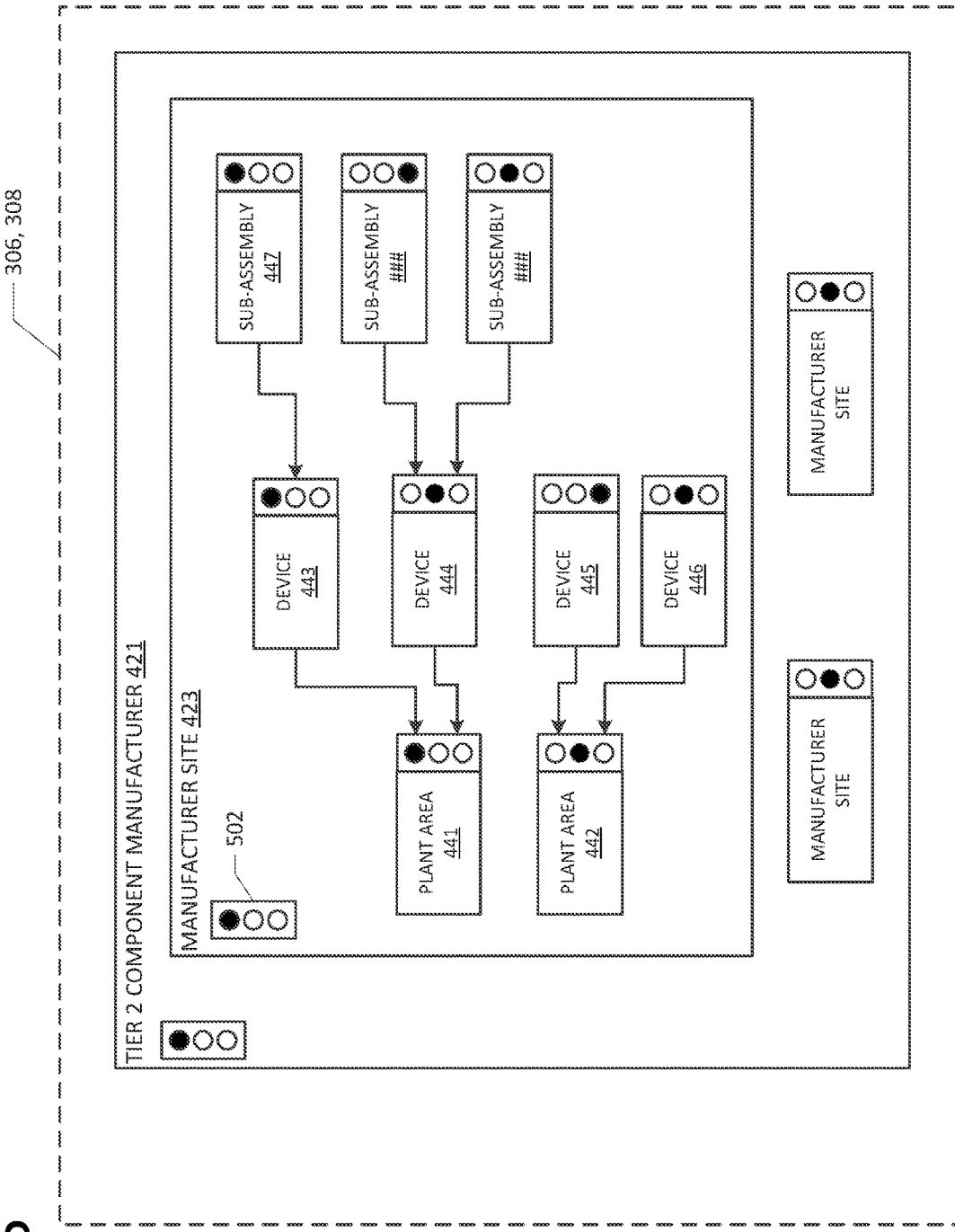
FIG. 5 illustrates an exemplary graphical user interface for presenting graphical compliance status indicators according to an embodiment.

FIG. 5 illustrates an exemplary graphical user interface GUI of management system 204 displayed by user computing device 308. The GUI includes a graphical object for each of the component manufacturer 421, manufacturer sites 423-425, plant areas 441 and 442, equipment devices 443-446, and sub-assemblies 447-449. A graphical compliance status indicator 502 is associated with each of the graphical objects to provide a real-time indication of compliance status of the sub-assemblies, equipment devices, plant areas, manufacturer sites, and manufacturer. In the embodiment illustrated in FIG. 5, the graphical compliance status indicators resemble a traffic light with three circular indicators. When the bottom indicator is activated (e.g., displayed as a green light, filled in, etc.) it represents that a compliance test was passed and is still valid. When the middle indicator is activated (e.g., displayed as a yellow light, filled in, etc.) it represents that a compliance test was passed but will expire within a predetermined period of time (e.g., 1 week). When the top indicator is activated (e.g., displayed as a red light, filled in, etc.) it represents that a compliance test was failed and/or is expired.

In the exemplary embodiment illustrated in FIG. 5, a compliance test failed and/or is expired for sub-assembly 447, as indicated by the associated compliance status indicator 502 having the top indicator activated. Accordingly, every level within which the non-compliant sub-assembly 447 is located is likewise non-compliant. As illustrated, the top indicator of the graphical compliance status indicator of device 443, plant area 441, manufacturer site 423, and manufacturer 421 is activated to indicate that each includes a component that failed a compliance test or the compliance test is expired.

Referring further to the exemplary embodiment illustrated in FIG. 5, the compliance test for device 446 was passed but will expire within a predetermined period of time, as represented by the activated middle indicator. Moving up to the next level, the middle indicator is also activated for plant area 442 because device 446 is within plant area 442. But the top indicator for manufacturer site 423 remains activated because plant area 441 still includes sub-assembly 447 with the failed/expired test.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one service provider computing device, the service provider computing device configured to transmit data, via a communications network, indicative of services performed on an instrument, the instrument comprising a device of an industrial process;
   a management system computing device, the management system computing device communicatively coupled to the at least one service provider computing device via the communications network, the management system computing device configured to generate a real-time compliance status for the device based on the data transmitted by the at least one service provider indicative of the services performed on the instrument; and
   a user computing device, the user computing device communicatively coupled to the management system computing device via the communications network,
   wherein the management system computing device is configured to provide the real-time compliance status of the device to the user computing device via the communications network in response to receiving a request for the real-time compliance status, and
   wherein the management system computing device is further configured to aggregate a multi-tier compliance status.

2. The system of claim 1, the user computing device displays a graphical representation of the real-time compliance status in response to said providing.

3. The system of claim 2, wherein the graphical representation includes at least one of: a pass indicator, an expired indicator, a failed indicator, and a passed but will expire in a predetermined amount of time indicator.

4. The system of claim 1, wherein the management system computing device is further configured to generate the real-time compliance status for a plant area within which the instrument is located and provide the real-time compliance status of the plant area to the user computing device via the communications network.

5. The system of claim 1, wherein the real-time compliance status of the instrument is provided to the user computing device in a unified format.

6. The system of claim 1, wherein the management system computing device is further configured to link the instrument to a corresponding certificate documenting compliance status.

7. A method comprising:
   receiving, by a management system computing device via a communications network, data indicative of services performed on a first instrument;
   receiving, by the management system computing device via the communications network, data indicative of services performed on a second instrument, the first and second instruments comprising a device of an industrial process;
   generating a real-time compliance status for the industrial process device by combining the data indicative of services performed on the first instrument with the data indicative of services performed on the second instrument;
   providing the real-time compliance status of the industrial process device to a user computing device via the communications network in response to a request therefor from the user computing device; and
   aggregating, by the management system computing device, a multi-tier compliance status.

8. The method of claim 7, wherein the user computing device displays a graphical representation of the real-time compliance status in response to said providing.

9. The method of claim 8, wherein the graphical representation includes at least one of: a pass indicator, an expired indicator, a failed indicator, and a passed but will expire in a predetermined amount of time indicator.

10. The method of claim 7, further comprising:
    generating a real-time compliance status for a plant area in which the industrial process device is located; and
    providing the real-time compliance status of the plant area to the user computing device via the communications network in response to a request therefor from the user computing device.

11. The method of claim 7, wherein the data indicative of services performed on the first instrument is in a first format and wherein the data indicative of services performed on the second instrument is in a second format.

12. The method of claim 7, wherein the real-time compliance status of the industrial process device is provided to the user computing device in a unified format.

13. The method of claim 7, further comprising linking the industrial process device to a corresponding certificate documenting compliance status.

* * * * *